United States Patent [19]

Gao

[11] Patent Number: 5,348,126

[45] Date of Patent: Sep. 20, 1994

[54] MULTIFUNCTIONAL ENERGY-SAVING SYSTEM FOR VEHICLES INCLUDING AN AUTOMATIC CLUTCH UNIT WITH BOTH DIFFERENTIAL AND ANTI-SLIP CAPABILITIES

[75] Inventor: Xinglong Gao, Guangdong, China

[73] Assignee: Hitop Science Technology Co., Ltd., Shenzhen, China

[21] Appl. No.: 3,599

[22] Filed: Jan. 13, 1993

[30] Foreign Application Priority Data

Jan. 25, 1992 [CN] China ................. 92100525.3

[51] Int. Cl.$^5$ .................. B60K 17/00; B60K 23/00; F16D 41/00
[52] U.S. Cl. .......................... 192/7; 192/35; 192/50; 192/44; 74/650
[58] Field of Search ............... 192/0.07, 35, 43.2, 192/44, 47, 50; 74/650

[56] References Cited

U.S. PATENT DOCUMENTS

| | | |
|---|---|---|
| 2,338,215 | 1/1944 | Summy . |
| 3,123,169 | 3/1964 | Young et al. ............ 192/44 X |
| 3,198,035 | 8/1965 | Mueller . |
| 3,300,002 | 1/1967 | Roper .................... 192/35 |
| 3,700,082 | 10/1972 | Schwab ................... 192/50 |
| 3,788,435 | 1/1974 | Prueter ................... 192/35 |
| 3,935,753 | 2/1976 | Williams .................. 74/650 |
| 4,030,581 | 6/1977 | Giometti ................ 192/44 X |
| 4,098,379 | 7/1978 | Fogelberg et al. ....... 192/47 X |
| 4,132,297 | 1/1979 | Brown et al. ............ 192/36 |
| 4,223,772 | 9/1980 | Telford ................. 192/48.6 |
| 4,224,840 | 9/1980 | Kraus . | 
| 4,408,503 | 10/1983 | Kraus . |
| 4,438,836 | 3/1984 | Kagata ................... 192/36 |
| 4,499,980 | 2/1985 | Kaminski et al. ......... 192/35 |
| 4,709,589 | 12/1987 | Kraus . |
| 5,007,498 | 4/1991 | Wiese et al. . |

FOREIGN PATENT DOCUMENTS

| | | |
|---|---|---|
| 20550806 | 1/1990 | China . |
| 2064720 | 10/1990 | China . |
| 3143023 | 5/1983 | Fed. Rep. of Germany . |
| 3217432 | 11/1983 | Fed. Rep. of Germany . |
| 3615005 | 11/1987 | Fed. Rep. of Germany . |
| 3830199 | 10/1989 | Fed. Rep. of Germany . |
| 2224087 | 4/1990 | United Kingdom . |

*Primary Examiner*—Richard M. Lorence
*Attorney, Agent, or Firm*—Longacre & White

[57] ABSTRACT

A multifunctional energy-saving system for vehicles is composed of an automatic clutch mechanism (1) and a control mechanism (2). The automatic clutch mechanism mainly comprises a shaft (4) with a regular prismatic section (5), a hub (6) and a synchronous cage (10) with torque-transmitting elements (12). When the speed of the shaft is higher than that of the hub torque is transmitted between them through the torque-transmitting elements (12). When the speed of the shaft becomes lower than that of the hub, no torque is transmitted between them. The shaft can be engaged with the hub as required at any time responding to the control mechanism. The energy consumption can be considerably reduced with the present system. When the automatic clutch mechanism having a symmetric structure is used in the system and disposed in place of the original differential of a vehicle, the automatic clutch mechanism can further function as a differential with anti-slip capabilities.

14 Claims, 10 Drawing Sheets

FIG. 14
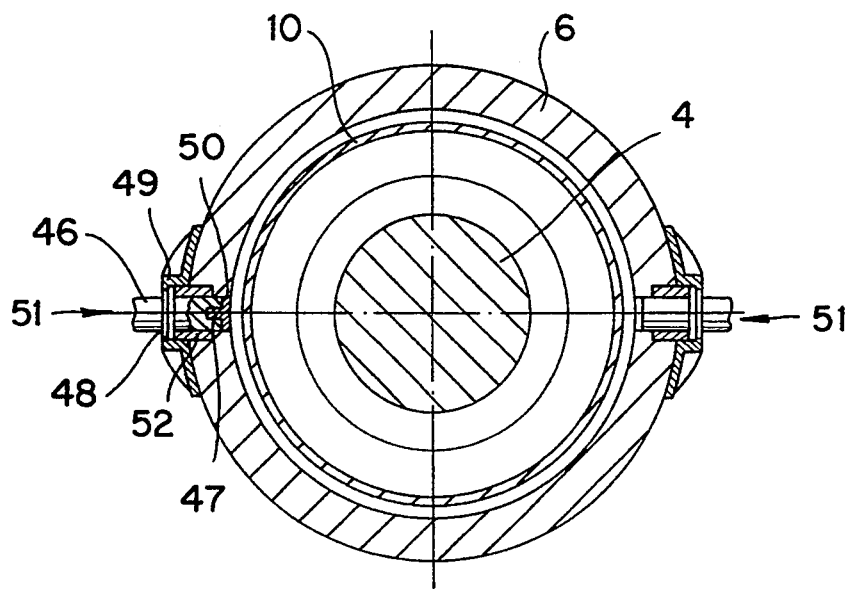
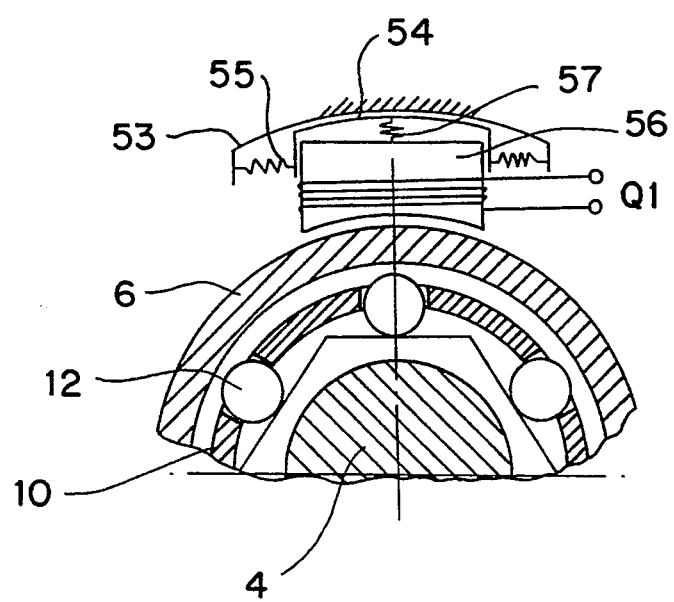
FIG. 15

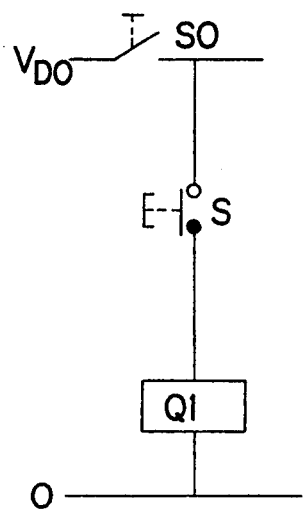
FIG. 16
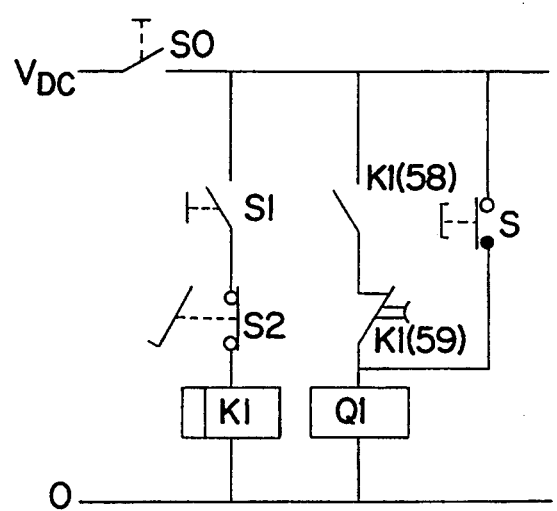
FIG. 17
FIG. 18
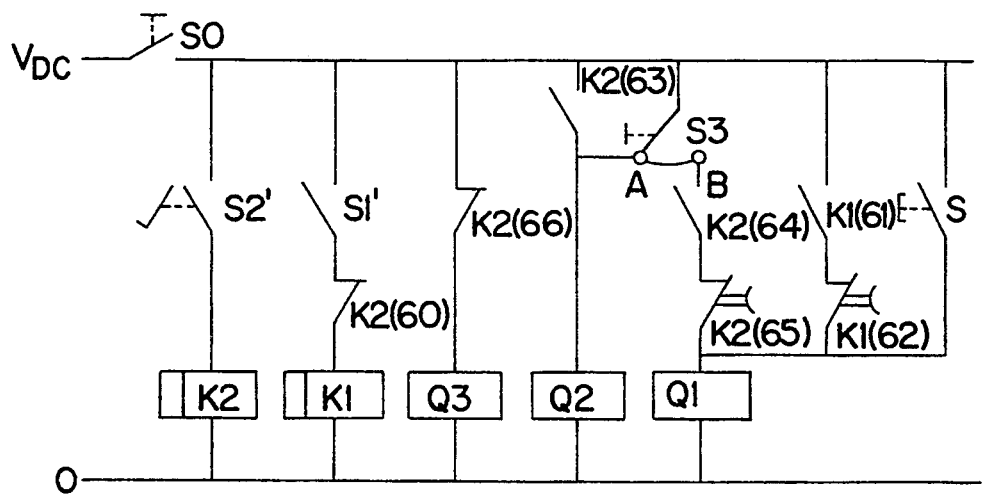

MULTIFUNCTIONAL ENERGY-SAVING SYSTEM FOR VEHICLES INCLUDING AN AUTOMATIC CLUTCH UNIT WITH BOTH DIFFERENTIAL AND ANTI-SLIP CAPABILITIES

BACKGROUND OF THE INVENTION

The invention relates to a multifunctional energy-saving system for vehicles, which consists of automatic clutch means disposed in the drive-system of a vehicle and control means for selecting working modes of the multifunctional energy-saving system.

In all conventional modern vehicles, the engine is in rigid connection with driving wheels so long as the clutch pedal is not pressed down and the transmission is not shifted to free position. This results in so-called "converse-driving" when a vehicle is travelling in a coast mode. Here, the term "converse-driving" means the engine is driven by the wheels because of the kinetic energy of the vehicle. Converse driving wastes a large amount of kinetic energy of a vehicle and results in such problems as additional wear, shortened service life and additional fuel consumption of vehicles. Therefore, from the viewpoint of the economy, energy-saving or development of the vehicle industry, it is not only necessary but also very important to solve the above-mentioned problems arising from converse-driving.

The existing solution for converse-driving problems is to reasonably let a vehicle travel in a coast mode by shifting the transmission of the vehicle to free position. Such a solution has, however, not been used extensively or as it should be used, because reasonable coasting of vehicles is limited by quite a few factors and the effect is not satisfactory. Moreover, it is a tax upon the drivers' mind and thereby affects driving safety.

On the other hand, conventional differentials of planetary gear type extensively used in modern vehicles can not prevent the wheels from slipping while on a slippery ground, and the passing ability of a driving wheel equipped with such a differential can considerably decrease and even drop to zero so that the vehicle can not move forward or backward. In order to overcome the drawback of the planetary gear differential, an existing solution is to provide a differential lock. But such a differential can not very well perform anti-slip and differential functions simultaneously. Moreover, the shift between its anti-slip function and its differential function can be made only when the vehicle is stopped. It is not convenient and will increase power loss. Although toothed free-wheel differentials and high-friction differentials of block-and-cam type can prevent from slipping fairly well, they have not been extensively used so far because of their complicated structure and high cost. Problems arising from converse-driving exist in all vehicles equipped with conventional differentials and such a vehicle does not have the function that whenever the vehicle is travelling in a coast mode, the engine can be automatically disengaged from the driving wheels and coasting of the vehicle can be effected automatically.

SUMMARY OF THE INVENTION

It is an object of the present invention to provide a multifunctional energy-saving system for vehicles to overcome problems arising from converse-driving.

It is another object of the present invention to provide a multifunctional energy-saving system for vehicles, in which an automatic clutch unit with both differential and slip-preventing capabilities is disposed in place of the original differential of a vehicle, and which will also function to solve problems arising from converse-driving.

According to the first aspect of the present invention, a multifunctional energy-saving system for vehicles consists of automatic clutch means and control means.

The automatic clutch means can be disposed in any suitable position in a drive-system of any available vehicle or newly-designed vehicle. The automatic clutch means comprises:

a drive member;

a driven member;

a shaft rigidly connected to or integrally formed with the drive member and having a substantially regular prismatic section concentric therewith;

a hub connected to or integrally formed with the driven member and mounted concentrically on said shaft by means of bearings, said regular prismatic section being positioned within the hub;

a synchronous cage rotatably supported at its axial ends on the shaft between the inner surface of the hub and said regular prismatic section, and having openings evenly distributed in the circumference of the synchronous cage, the number of said openings being the same as that of the side surfaces of said regular prismatic section;

a torque-transmitting element provided in each said opening with a clearance therebetween, and moveable on respective side surface of said regular prismatic section between a first position near one end of respective arched space defined between the inner surface of the hub and the side surface of said regular prismatic section and a second position near the other end of said arched space, each torque-transmitting element being dimensioned so that when it is in the middle position between said first position and said second position, the hub is in disengagement with the shaft and therefore no torque is transmitted between said shaft and said hub through the torque-transmitting element and when it is in said first position or said second position, the hub is in engagement with the shaft and torque is transmitted between the shaft and the hub through the torque-transmitting element;

means for holding each torque-transmitting element in said middle position when the drive member rotates at a speed lower than its idle speed corresponding to the idle speed of engine or does not rotate, each said torque-transmitting element entering said first position due to inertia lag behind the shaft when the drive member starts to rotate in a positive direction (corresponding to the forward direction of the vehicle);

means for restricting each torque-transmitting element in said middle position when the speed of the drive member becomes lower than that of the driven member only in said positive direction; and means for enforcing the synchronous cage to rotate along with the hub for a while, causing each torque-transmitting element to move from said middle position to one of said first position and said second position.

The control means for selecting working modes of the multifunctional energy-saving system for vehicles can control the operation of said enforcing means as required at any time.

In particular embodiments of the multifunctional energy-saving system for vehicles according to the present invention, the above-mentioned various means of the system can have different forms or structures.

Said holding means may comprise a magnet in the middle of each side surface of said regular prismatic section of the shaft or comprise two elastic loops respectively winding round both axial ends of said torque-transmitting elements. Alternatively, said holding means may also comprise extension springs connected between the synchronous cage and the regular prismatic section of the shaft, and dovetail slide means between each said torque-transmitting element and the regular prismatic section.

In one embodiment, said restricting means comprises:

at least two grooves evenly distributed in the circumference of the synchronous cage;

recesses each formed in said shaft, and each of said recesses associated with one said groove and having a radial wall;

an opening formed in the bottom of each said groove and communicating with one of said recesses;

a magnet mounted in the bottom of each said groove; and a rocking lever pivotally mounted in each said groove and having a spring which is fixed at one end on the rocking lever and extends through said opening, the rocking lever being arranged so that when said shaft rotates at a speed lower than a predetermined value or does not rotate, the rocking lever is held on the bottom of said groove by means of said magnet, causing said spring to be situated outside said recess in said shaft and when the speed of said shaft reaches said predetermined value, the rocking lever pivots against the attractive force of said magnet due to the centrifugal force, causing said spring to enter said recess, the stiffness of said spring ensuring that the spring can abut against said radial wall of said recess so as to restrict the torque-transmitting element right in said middle position during the movement of the torque-transmitting element from said first position towards said second position whenever the speed of said shaft becomes lower than that of the hub, and that when said enforcing means forces the synchronous cage to rotate along with the hub, the spring can be bent by said radial wall so as to enable the torque-transmitting element to move from said middle position to the second position.

In another embodiment, said restricting means comprises:

at least two grooves evenly distributed in the circumference of said shaft;

a magnet provided in the bottom of each said groove;

stop means provided on the inner surface of the synchronous cage;

a rocking lever means pivotally mounted in each said groove and having a sleeve, a member axially sliding within said sleeve and a spring biasing said sliding member to an extended position, each said rocking lever means being arranged so that when said shaft rotates at a speed lower than a predetermined value or does not rotate, the rocking lever means is held on the bottom of said groove by means of said magnet and the sliding member in said extended position does not impede or interfere in the relative rotation of the synchronous cage with respect to the shaft, and when the speed of said shaft reaches said predetermined value, the rocking lever means pivots due to the centrifugal force so that the sliding member in said extended position comes into contact with the inner surface of the synchronous cage, the stiffness of said spring ensuring that the sliding member remains in said extended position and can abut against said stop means provided on the inner surface of the synchronous cage so as to restrict the torque-transmitting element right in said middle position during the movement of said torque-transmitting element from said first position towards said second position whenever the speed of said shaft becomes lower than that of the hub, and that the sliding member can be pressed back into said sleeve by said stop means so as to enable the torque-transmitting element to move from said middle position to said second position when said enforcing means forces the synchronous cage to rotate along with the hub.

In a further embodiment, said restricting means comprises:

at least two holes in the shaft, the axes of the holes lying in a plane perpendicular to the axis of the shaft;

a magnet mounted in the bottom of each said holes in the shaft;

stop means provided on the inner surface of the synchronous cage;

a pin axially moveable in each said hole, the outer end of each said pin being of truncated cone shape, each said pin being arranged so that when the shaft rotates at a speed lower than a predetermined value or does not rotate, the pin is held on the bottom of said hole by means of said magnet without interfering in the relative rotation of the synchronous cage with respect to the shaft and when the speed of the shaft reaches said predetermined value, the pin comes against the attractive force of said magnet into contact with the inner surface of the synchronous cage due to the centrifugal force, the combination of the cone angle of the outer end of the pin and the direction of the holes extending in said plane perpendicular to the axis of the shaft ensuring that the outer end of the pin can abut against said stop means provided on the inner surface of the synchronous cage without being pressed back into the hole by said stop means so as to restrict the torque-transmitting element right in said middle position during the movement of the torque-transmitting element from said first position towards said second position whenever the speed of the shaft becomes lower than that of the hub, and when said enforcing means forces the synchronous cage to rotate along with the hub, the pin can be pressed back into the hole by the said stop means against the static frictional force between the pin and the hole so as to enable the torque-transmitting element to move from said middle position to said second position.

In one embodiment, said enforcing means comprises:

actuator means connected to a fixed member of the vehicle and controlled by said control means;

a friction member adapted to be engaged with the synchronous cage; and a driving assembly provided on the hub for transmitting the power of said actuator means to said friction member so that the friction member can be engaged with the synchronous cage.

Said actuator means may be an electromagnet, a hydraulic cylinder or a pneumatic cylinder.

In a simplified embodiment, said control means comprises a button switch to control the operation of said actuator means.

The control means may further comprise:

a first switch for selection of working modes of the system; and a time-delay circuit adapted to be turned on by another switch coupled with the accelerator pedal of the vehicle for energizing said actuator means so as to engage the engine with the driving wheels when the accelerator pedal is released.

Alternatively, the control means may further comprise:

switches for selecting working modes of the system;

a first time-delay circuit adapted to be controlled by another switch coupled with the accelerator pedal of the vehicle for energizing said actuator means so as to engage the engine with the driving wheels when the accelerator pedal is released; and a second time-delay circuit adapted to be controlled by said another switch coupled with the accelerator pedal for turning off the ignition circuit of the engine when the accelerator pedal is released and for turning on the ignition circuit and meanwhile energizing said actuator means for a while so as to engage the engine with the driving wheels during the delay period in opening of said second time-delay circuit so that the engine is driven and restarted by the wheels when the accelerator pedal is pressed down again.

The operation of the system according to the first aspect of the present invention will now be briefly described.

When the drive member does not rotate, the torque-transmitting elements are held in said middle position. When the drive member starts to rotate in a positive direction (corresponding to the forward direction of the vehicle), the synchronous cage ensures that all the torque-transmitting elements synchronously move from the middle position to the first position due to their inertia lag behind the shaft in rotation. In this case, the torque-transmitting elements are self-locked between the regular prismation section of the shaft and the inner surface of the hub due to static friction and thus the shaft is in engagement with the hub through the torque-transmitting elements so that torque is transmitted from the engine of the vehicle to the driving wheels via the drive-system. After the shaft reaches a predetermined speed and if the speed of the drive member becomes lower than that of the driven member, the synchronous cage together with the torque-transmitting elements will move from the first position towards the second position due to their inertia. During this movement, however, the restricting means will restrict the torque-transmitting elements right in the middle position so that the shaft is in disengagement with the hub and no torque is transmitted from the driving wheels of the vehicle to the engine. In this case, the vehicle is travelling in a coast mode by making full use of the kinetic energy of the vehicle and the problems arising from converse-driving are fairly well eliminated.

When the vehicle is coasting on a slippery ground or down a long steep road, there is a need to retard the vehicle by engaging the engine with the driving wheels for driving safety. In this case, the enforcing means can work for a while at any time as required by operating the control means so that the torque-transmitting elements move from the middle position to the second position and the shaft can be conversely driven by the hub. In this manner, the braking effect of the vehicle can be improved for driving safety.

On the other hand, when the drive member starts from a rest state to rotate in an inverse direction (corresponding to the backward direction of the vehicle), the synchronous cage together with the torque-transmitting elements will move from the middle position to the second position due to their inertia lag behind the shaft in rotation, and thus the shaft is in engagement with the hub so that torque can be transmitted from the engine to the driving wheels and the vehicle can move backward.

According to the second aspect of the present invention, a multifunctional energy-saving system is composed of an automatic clutch unit which is disposed in place of the original differential of a vehicle and control means which is similar to that of the system according to the first aspect of the invention.

The automatic clutch unit is composed of two portions, which are similar to the automatic clutch means of the system according to the first aspect of the invention and symmetric with each other in respect to the intermediate cross-section of the flange, which is used as a common drive member of the two portions. Said flange is connected to a driven bevel gear of a final reduction gearing and the hubs of both portions of the automatic clutch unit are connected respectively to the semiaxles on both sides of the vehicle.

When the engine drives the vehicle to travel along a straight road, the hubs of the automatic clutch unit on both sides rotate at the same speed as the shaft since they are in engagement with the same shaft.

When the engine drives the vehicle to travel along a curve road, the hub of the automatic clutch unit on the inner side is in engagement with the shaft and rotates along with the shaft, and the hub on the outer side is disengaged with the shaft since it is driven by the wheel on the outer side to rotate at a higher speed than the shaft. Furthermore, independent of the level of the adhensive force of the driving wheel on any side, it will never occur that the wheel on one side slips while the wheel on the other side does not rotate since the hubs on both sides are supported on the same shaft. In this manner, the system according to the second aspect of the present invention can not only overcome the problems arising from converse-driving but also function as a differential with a good antislip performance.

BRIEF DESCRIPTION OF THE DRAWINGS

The present invention will become more readily apparent from the following description of preferred embodiments thereof shown, by way of example only, in the accompanying drawings, in which:

FIG. 14 shows another embodiment of the means for enforcing the synchronous cage to rotate along with the hub for a while, causing each torque-transmitting element to move from the middle position to the second position;

FIG. 15 shows a further embodiment of the enforcing means;

FIG. 16 shows a simplified embodiment of the control means;

FIG. 17 shows another embodiment of the control means;

FIG. 18 shows a further embodiment of the control means; and

DETAILED DESCRIPTION

Figure 1:
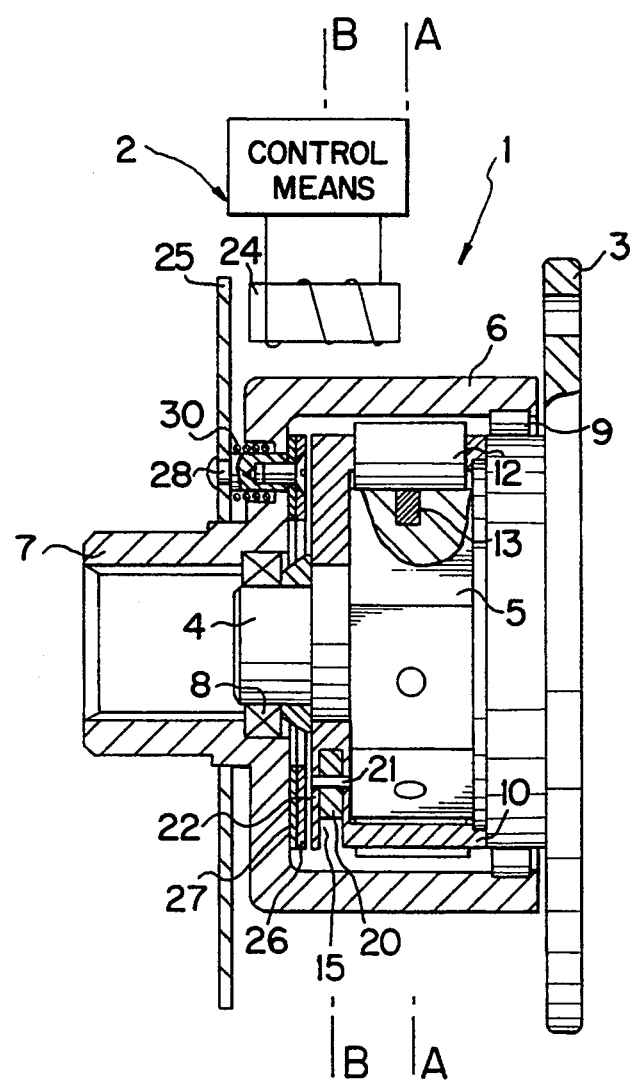
FIG. 1 is a diagrammatic view of the system according to the first aspect of the present invention.

Referring to the drawings wherein like reference numerals designate like or corresponding parts throughout the different views, there is shown in FIG. 1 a multifunctional energy-saving system according to the first aspect of the invention including automatic clutch means 1 and control means 2.

Figure 2:
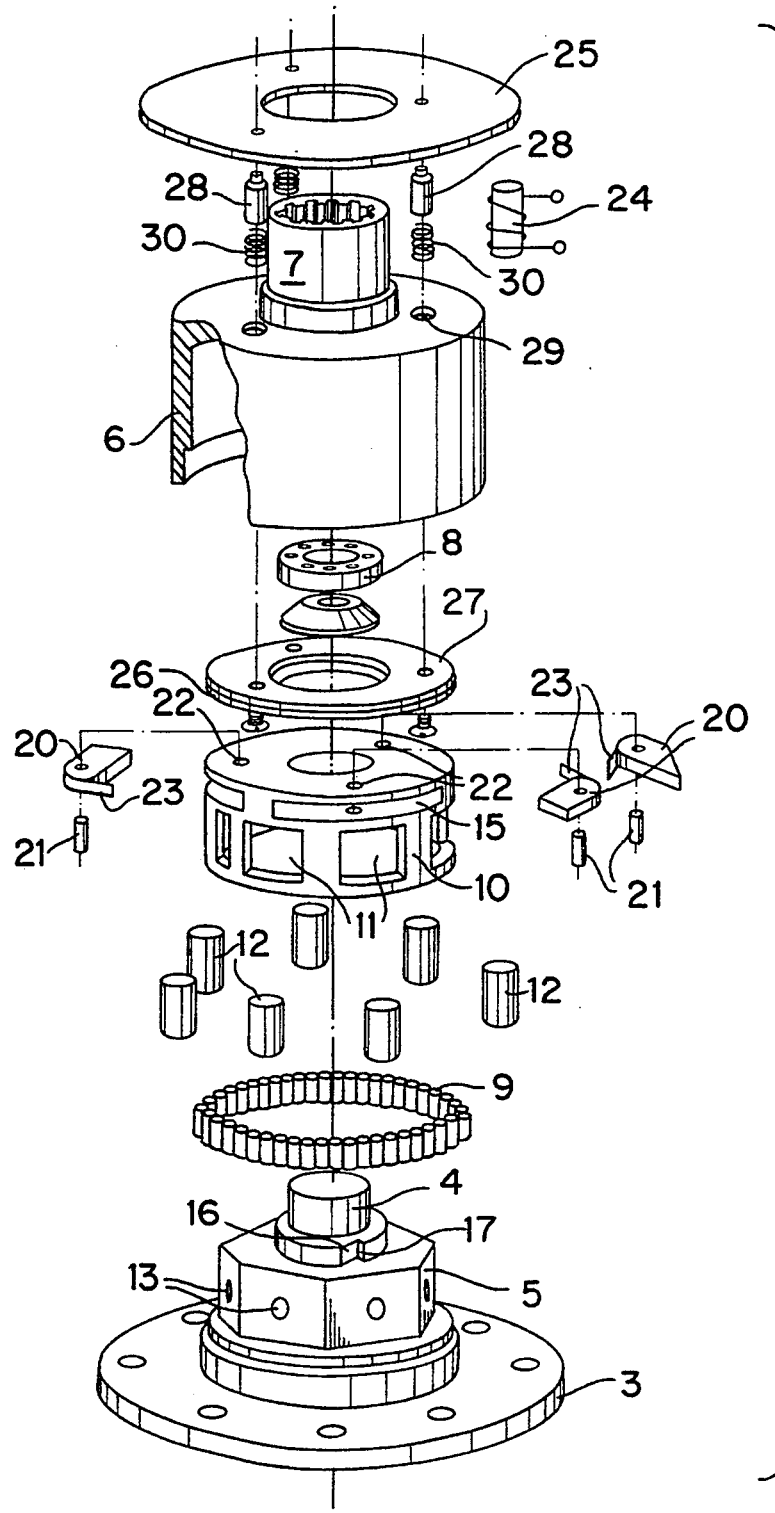
FIG. 2 is an exploded perspective view of the main structure of the system according to the first aspect of the present invention.
Figure 3:
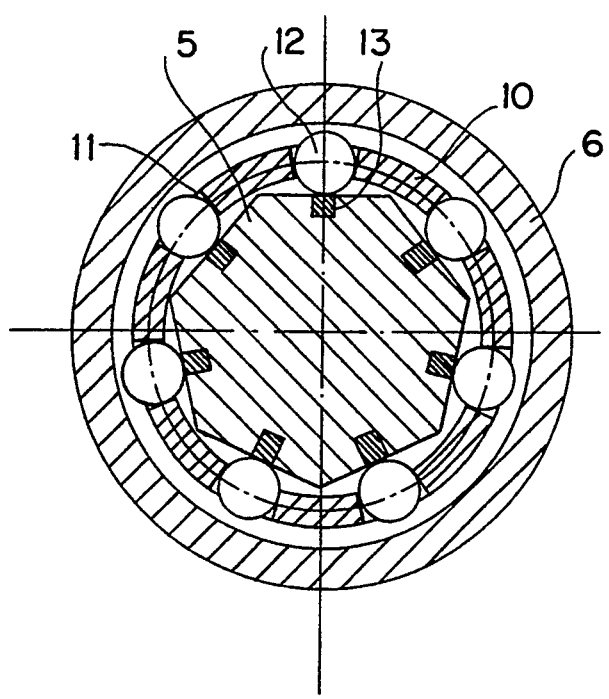
FIG. 3 is a cross-sectional view along lines A—A of FIG. 1.
Figure 4:
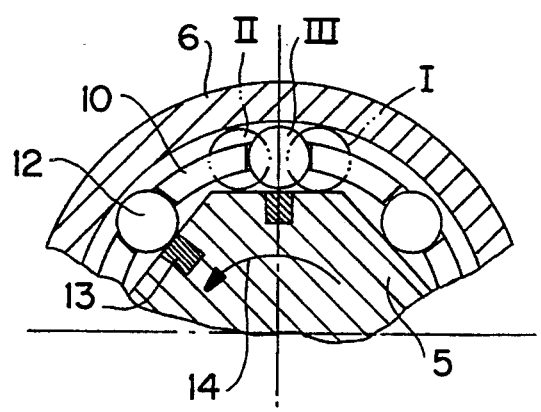
FIG. 4 is a partial view of FIG. 3, showing the different working positions of the torque-transmitting elements of the automatic clutch means shown in FIG. 1.

In the automatic clutch means 1, a drive member 3 is in the form of a flange which is rigidly connected to or integrally formed with a shaft 4. The shaft 4 has a substantially regular prismatic section 5 concentric therewith. A hub 6 is connected to or integrally formed with a driven member 7 and mounted concentrically on the shaft 4 by means of bearings 8 and 9. The regular prismatic section 5 of the shaft 4 is positioned within the hub 6. A synchronous cage 10 is rotatably supported at its axial ends on the shaft 4 between the inner surface of the hub 6 and the regular prismatic section 5. Openings 11 (see FIGS. 2 and 3) are evenly distributed in the circumference of the synchronous cage 10 and the number of the openings 11 corresponds to that of the side surfaces of the regular prismatic section 5. A torque-transmitting element 12 is provided in each said opening 11 and moveable on a respective side surface of the regular prismatic section 5 between a first position I and a second position II (FIG. 4). The first position I and the second position II are respectively near the narrow ends of the arched space defined between the inner surface of the hub 6 and the side surface of the regular prismatic section 5. Each torque-transmitting element 12 is dimensioned so that when it is in the middle position III (FIG. 4) between the first position I and the second position II, the hub 6 is in disengagement with the shaft 4 and therefore no torque is transmitted between the shaft 4 and the hub 6 through the torque-transmitting elements 12 and when it is in the first position I or the second position II, the hub is in engagement with the shaft 4 and torque is transmitted between the shaft 4 and the hub 6 through the torque-transmitting elements 12.

Means is provided for holding each torque-transmitting element 12 in the middle position III when the shaft 4 rotates at a speed lower than its idle speed or does not rotate. This holding means ensures that each torque-transmitting element 12 does not come into contact with the inner surface of the hub 6 when the vehicle is coasting. The holding means shown in FIGS. 1 and 3 is in the form of a magnet 13 provided in the middle of each side surface of the regular prismatic section 5. When the drive member 3 starts to rotate in a positive direction (corresponding to the forward direction of the vehicle) as shown by the arrow 14 (FIG. 4), the synchronous cage 10 ensures that each torque-transmitting element 12 synchronously enters the first position I due to their inertia lag behind the shaft 4 in rotation. On the other hand, when the drive member 3 starts to rotate in an inverse direction (corresponding to the backward direction of the vehicle), the synchronous cage 10 ensures that each torque-transmitting element 12 synchronously enters the second position II.

Figure 5:
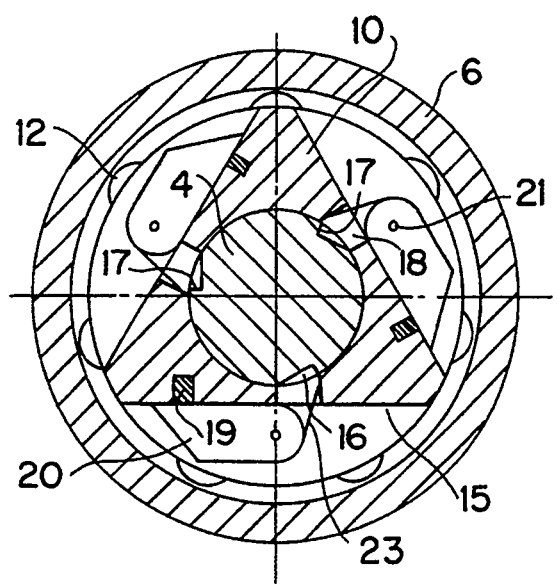
FIG. 5 is a cross-sectional view along lines B—B of FIG. 1, showing the structure of the means for restricting the torque-transmitting elements right in the middle position when the speed of the drive member becomes lower than that of the driven member in a positive rotational direction.
Figure 6:
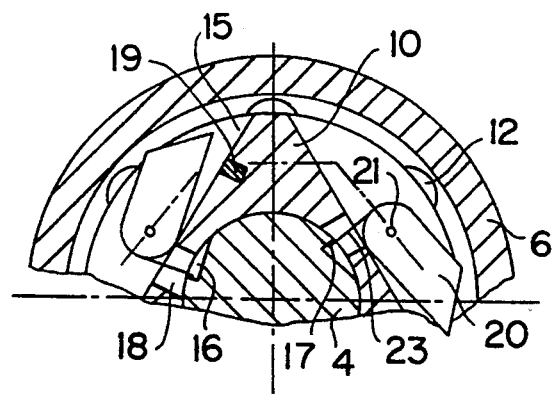
FIG. 6 is a partial cross-section view similar to FIG. 5, showing that the springs fixed on the rocking levers are abutting against the radial walls of the recesses in the shaft and the torque-transmitting elements are right in the middle position.

Means is provided for restricting each torque-transmitting element 12 in the middle position III when the speed of the drive member 3 becomes lower than that of the driven member 7 only in said positive direction. FIGS. 1, 5 and 6 show a particular embodiment of such restricting means.

As shown in FIG. 5, three grooves 15 are evenly distributed in the circumference of the synchronous cage 10. Three recesses 16 are formed in the shaft 4 corresponding to the three grooves 15. Each recess 16 has a radial wall 17. An opening 18 is formed in the bottom of each groove 15 and communicates with one of the recesses 16. A magnet 19 is mounted in the bottom of each groove 15. A rocking lever 20 is pivotally mounted by means of a pin 21 in each groove 15. The pin 21 is mounted in two holes 22 formed respectively in the opposite side walls of the groove 15. A spring 23 is fixed at one end of each rocking lever 20 and extends through the opening 18. Each rocking levers 20 is arranged so that when the shaft 4 rotates at a speed lower than a predetermined value (e.g. the predetermined value may correspond to a vehicle speed of about 5–10 kilometer per hour) or does not rotate, the rocking lever 20 are held on the bottom of the groove 15 by means of the magnet 19, causing the spring 23 to be positioned outside the recess 16 as shown in FIG. 5, and when the speed of the shaft 4 reaches the predetermined value, the rocking lever 20 pivots about the pin 21 against the attractive force of the magnet 19 due to the centrifugal force, causing the spring 23 to enter the recess 16. The stiffness of the spring 23 ensures that the spring 23 can abut against the radial wall 17 of the recess 16 as shown in FIG. 6 so as to restrict the torque-transmitting element 12 right in the middle position III during the movement of the torque-transmitting element 12 from the first position I towards the second position II due to inertia whenever the speed of the shaft 4 becomes lower than that of the hub 6, and that when enforcing means, the structure of which will be described hereinafter, forces the synchronous cage 10 together with the torque-transmitting elements 12 to rotate along with the hub 6, the spring 23 can be bent by said radial wall 17 so as to enable each torque-transmitting element 12 to move from the middle position III to the second position II. Thus, the shaft 4 is engaged again with the hub 6 and torque is transmitted from the hub 6 to the shaft 4 in order to retard the vehicle or improve braking effect for driving safety.

One embodiment of the above-mentioned enforcing means is shown in FIG. 1. At least two electromagnet means 24 are evenly distributed around the hub 6 and mounted respectively on a fixed member of the vehicle and controlled by control means 2. When the electromagnet means 24 is energized for a while by means of the control means 2, a disc 25 mounted slidably on the driven member 7 is attracted by the electromagnet means 24 so that a friction disc 26 fixed on a base disc 27 is pressed onto the end face of the synchronous cage 10 via three pins 28 so that the synchronous cage 10 rotates along with the hub 6 for a certain angle, causing the torque-transmitting elements 12 to move from the middle position III to the second position II. The pins 28 are fixed on the disc 25 at one end and on the base disc 27 at the other end. The pins 28 respectively extend through three holes 29 which are evenly distributed on the end face of the hub 6. When the electromagnet means 24 is deenergized by means of the control means 2, the disc 25 and therefore the friction disc 26 are returned by means of return springs 30 each mounted on one of the pins 28 between the disc 25 and the end surface of the hub 6. The torque-transmitting elements 12 will remain in the second position II until the speed of the drive member 3 becomes higher than that of the driven member 7.

In the embodiment of the system according to the first aspect of the present invention as shown in FIGS. 1–6, the torque-transmitting elements 12 are of cylindrical shape. They may, however, be of other shapes. For example, the cross section of the torque-transmitting elements 12' as shown in FIG. 7 is defined by an arc and a broken line so as to increase their load capacity.

Figure 7:
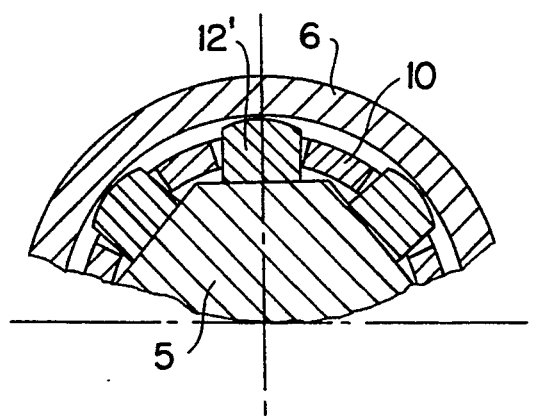
FIG. 7 shows another embodiment of the torque-transmitting elements.
Figure 8:
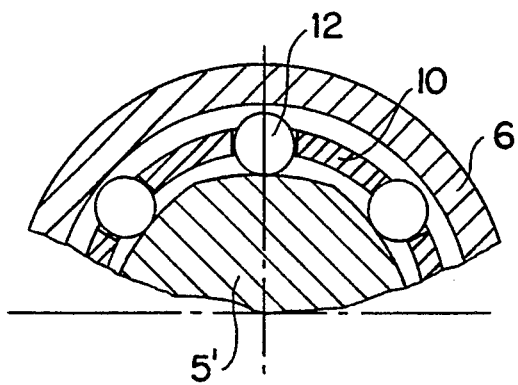
FIG. 8 shows another embodiment of the substantially regular prismatic section of the shaft.

The side surfaces of the regular prismatic section 5 of the shaft 4 are planar, which is simple in structure, easy to manufacture and adapted to cooperate with the torque-transmitting elements 12' having a larger load capacity as shown in FIG. 7. The wedge angle for self-locking of the torque-transmitting elements 12 in the first position I or in the second position II will gradually increase due to wear and tear of the torque-transmitting elements 12, the side surfaces of the regular prismatic section 5 and the inner surface of the hub 6. The wedge angle may become too large for the torque-transmitting elements 12 to self-lock, causing failure of the system. To overcome this problem, the section 5' as shown in FIG. 8 may be used, the side surfaces of which are of logarithmic helicoid or circular arched surface. With such a section 5', the wedge angle, i.e., the angle included by the common tangent passing through the contact point between a torque-transmitting element 12 and the inner surface of the hub 6 and the common tangent passing through the contact point between the torque-transmitting element 12 and the side of the section 5' will remain substantially unchanged and therefore the service life is prolonged.

Figure 9:
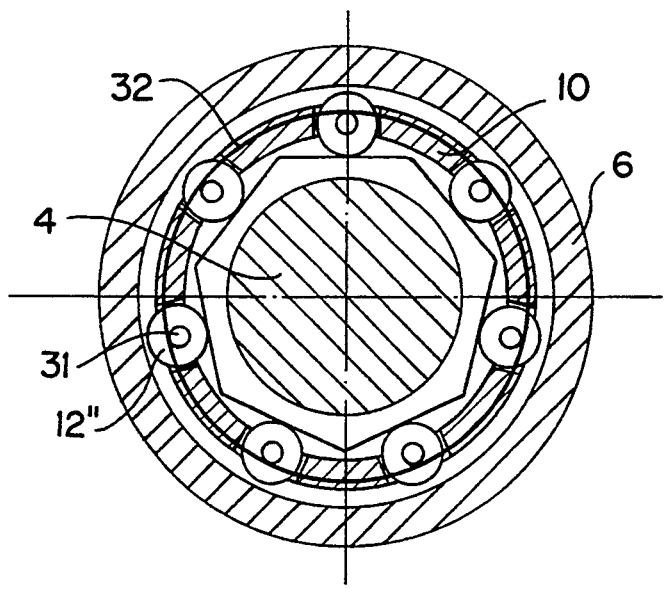
FIG. 9 and FIG. 10 show another embodiment of the means for holding each torque-transmitting element in the middle position when the drive member rotates at a speed lower than its idle speed or does not rotate.
Figure 10:
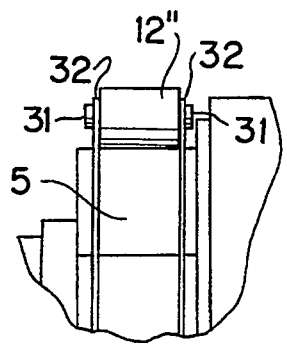

FIGS. 9 and 10 show another embodiment of the means for holding each torque-transmitting element 12 in the middle position III when the drive member 3 rotates at a speed lower than its idle speed or does not rotate. In this embodiment of the holding means, each torque-transmitting element 12" has two short rods 31 formed respectively at the central areas of both axial end faces of the torque-transmitting element 12". Two elastic loops 32 wind round the short rods 31 respectively at both axial ends of the torque-transmitting elements 12" so as to hold the torque-transmitting elements 12" in the middle position III, i.e., the radially innermost position on respective side surfaces of the regular prismatic section 5 or 5' when the drive member 3 rotates at a speed lower than its idle speed or does not rotate.

Figure 11:
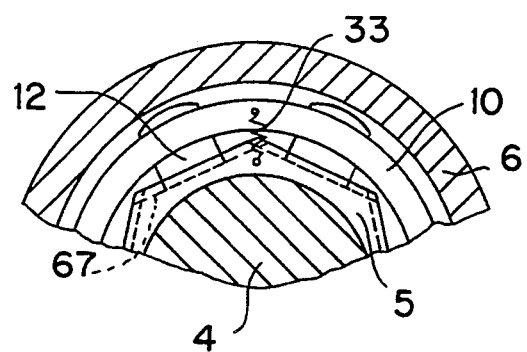
FIG. 11 shows a further embodiment of the holding means.

Alternatively, FIG. 11 shows a further embodiment of the holding means, in which a plurality of extension springs 33 are respectively connected between the regular prismatic section 5 or 5' and the synchronous cage 10 and dovetail slide means 67 between each said torque-transmitting element 12' and the regular prismatic section, which prevents the torque-transmitting element 12' from departing from the side surface of the regular prismatic section 5 during the movement of the torque-transmitting element 12' between the first position I and the second position II.

Figure 12:
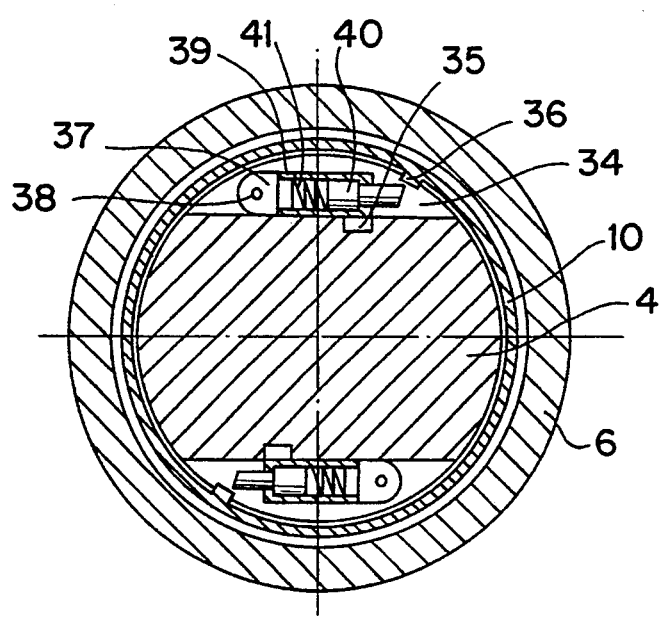
FIG. 12 shows another embodiment of the means for restricting the torque-transmitting elements right in the middle position when the speed of the drive member becomes lower than that of the driven member in the positive rotational direction.

FIG. 12 shows another embodiment of the restricting means. As shown in FIG. 12, two grooves 34 are evenly distributed in the circumference of the shaft 4 or in an annular member (not shown) fixed on a shoulder of the shaft 4. A magnet 35 is mounted in the bottom of each groove 34. Stop means 36 are formed on the inner surface of the synchronous cage 10. A rocking lever means 37 is pivotally mounted in each groove 34 by means of a pin 38 in the same manner as the rocking lever 20 discribed by referring to FIGS. 1 to 5. Each rocking lever means 37 comprises a sleeve 39, a member 40 axially sliding within the sleeve 39 and a spring 41 biasing the sliding member 40 to an extended position as shown. Each rocking lever means 37 is arranged so that when the shaft 4 rotates at a speed lower than a predetermined value or does not rotate, the rocking lever means 37 is held on the bottom of the groove 34 by means of the magnet 35 and the sliding member 40 in the extended position does not interfere in the relative rotation of the synchronous cage 10 with respect to the shaft 4, and when the speed of the shaft 4 reaches the predetermined value, the rocking lever means 37 will pivot about the pin 38 due to the centrifugal force so that the sliding member 40 in the extended position comes into contact with the inner surface of the synchronous cage 10. The stiffness of the spring 41 ensures that the sliding member 40 remains in the extended position and abuts against the stop means 36 on the inner surface of the synchronous cage 10 so as to restrict the torque-transmitting element 12,12' or 12" right in the middle position III during the movement of the torque-transmitting element 12,12' or 12" from the first position I towards the second position II whenever the speed of the shaft 4 becomes lower than that of the hub 6, and that the sliding member 40 can be pressed back into the sleeve 39 by the stop means 36 so as to enable the torque-transmitting element 12,12' or 12" to move from the middle position III to the second position II when the enforcing means forces the synchronous cage 10 to rotate along with the hub 6.

Figure 13:
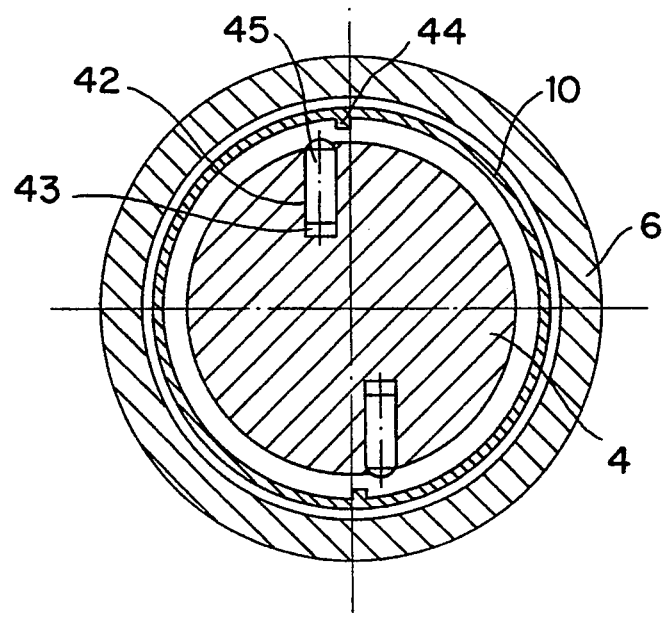
FIG. 13 shows a further embodiment of the restricting means.

Alternatively, FIG. 13 shows a further embodiment of the restricting means. As shown in FIG. 13, two holes 42 are formed in the shaft 4 and the axes of both holes 42 lie in one plane perpendicular to the axis of the shaft 4. A magnet 43 is mounted in the bottom of each hole 42. Stop means 44 are provided on the inner surface of the synchronous cage 10. A pin 45 is moveably mounted in each hole 42. The outer end of each pin 45 is of truncated cone shape. Each pin 45 is arranged so that when the speed of the shaft 4 is lower than a predetermined value or does not rotate, the pin 45 is held on the bottom of the hole 42 by means of the magnet 43 without interfering in the relative rotation of the synchronous cage 10 with respect to the shaft 4, and when the speed of the shaft 4 reaches the predetermined value, the pin 45 comes against the attractive force of the magnet 43 into contact with the inner surface of the synchronous cage 10 due to the centrifugal force. The combination of the cone angle of the outer ends of the pins 45 and the direction of the holes 42 in the plane perpendicular to the axis of the shaft 4 ensures that the outer ends of the pins 45 can abut against the stop means 44 on the inner surface of the synchronous cage 10 without being pressed back into the holes 42 by the stop means 44 so as to restrict the torque-transmitting elements 12 right in the middle position III during the movement of the torque-transmitting elements 12 from the first position I towards the second position II whenever the speed of the shaft 4 becomes lower than that of the hub 6, and the pins 45 can be pressed back into the holes 42 by the stop means 44 against the static frictional force therebetween so as to enable the torque-transmitting elements 12 to move from the middle position III to the second position II when the enforcing means forces the synchronous cage 10 to rotate along with the hub 6.

FIG. 14 shows another embodiment of the enforcing means. As shown in FIG. 14, two stems 46 each have at one end a friction member 47 adapted to be engaged with the synchronous cage 10. The stems 46 respectively extend through a hole 48 in a cover 49 fixed on the outer surface of the hub 6 and a hole 50 in the hub 6 for rotating along with the hub 6. The stems 46 are arranged so that when they are driven by known actuator means (not shown) responding to the control means of the system to move in the direction shown by arrows 51, the friction members 47 are engaged with the synchronous cage 10 so that the latter rotates along with the hub 6 for a certain angle, causing the torque-transmitting elements 12 to move from the middle position III to the second position II. The stems 46 and therefore the friction members 47 will return to their original position by means of return springs 52 when the actuator means no longer drives the stems 46.

FIG. 15 shows a further embodiment of the enforcing means, which is suitable for vehicles having a high-power electricity supply. As shown in FIG. 15, arc guide means 53 is rigidly connected to a fixed structural member of the vehicle. A radial guide means 54 is balanced in the middle of the arc guide means 53 by means of two springs 55 and adapted to slide along the arc guide means 53 against the forces of the springs 55. An electromagnet 56 is adapted to move within the radial guide means 54. A spring 57 normally pulls the electromagnet 56 to a radially outer position where the latter is in disengagement with the external surface of the hub 6. When the electromagnet 56 is energized responding to the control means 2 of the system, the electromagnet 56 comes into contact with the external surface of the hub 6 against the force of the spring 57 and moves along with the hub 6 for a certain distance together with the radial guide means 54 against the forces of the springs 55 and under the guidance of the arc guide means 53 so that respective torque-transmitting elements 12 comes into contact with the inner surface of the hub 6 under the attraction of electromagnet 56 and moves along with the electromagnet 56 from the middle position III to the second position II. When the electromagnet is deenergized responding to the control means 2 of the system, the electromagnet 56 and the radial guide means 54 return to their original positions respectively by means of the spring 57 and the springs 55.

FIG. 16 shows a simplified embodiment of the control means 2 of the system according to the present invention. In the control circuit shown in FIG. 16, S0 denotes the main switch of the vehicle; S denotes a button switch and Q1 denotes, if the actuator means of the enforcing means comprises an electromagnet, an exciting coil of the electromagnet or denotes, if the actuator means of the enforcing means comprises a cylinder, a solenoid valve controlling the cylinder.

When the vehicle equipped with the system of the present invention is travelling, and if the speed of the drive member 3 of the automatic clutch means becomes lower than that of the driven member 7, the former will be automatically disengaged with the latter and the vehicle will be travelling in a coast mode so that the object of energy-saving is attained. And when the vehicle is coasting and if there is a need to engage the engine with the driving wheels for driving safty, the button switch S is pressed for a while so that the enforcing means forces torque-transmitting elements 12 to move from the middle position III to the second position II as described above.

FIG. 17 shows another embodiment of the control means 2 of the system of the present invention. In the control circuit shown in FIG. 17, S1 denotes a switch for selecting the working modes of the system, S2 denotes a normal close switch coupled with the accelerator pedal, K1 denotes a time-delay relay having a normal open contact K1 (58) and a normal close time-delay contact K1 (59).

When the switch S1 is off, the control means 2 will work in the same manner as that described by referring to FIG. 16. When the switch S1 is on and the accelerator pedal is pressed down, the drive member 3 will be rotating at a higher speed than the driven member 7 so that the torque-transmitting elements 12 move from the middle position III or the second position II to the first position I. In this case, the switch S2 coupled with the accelerator pedal is open, the contact K1 (58) is open and the contact K1 (59) is close. When the accelerator pedal is released, the switch S2 is closed to energize the relay K1 so that the contact K1 (58) is closed and the contact K1 (59) will delay in opening. During the delay period of the contact K1 (59), Q1 is energized so that the enforcing means forces the synchronous cage 10 to rotate along with the hub 6, causing the torque-transmitting elements 12 move from the first position I to the second position II since the speed of the drive member 3 becomes lower than that of the driven member 7 after the accelerator pedal is released. In this case, the engine is conversely driven by the wheels so as to retard the vehicle or to improve the braking effect.

FIG. 18 shows a further embodiment of the control means 2 of the system according to the present invention, which is applicable in gasoline engine vehicles or electric motor cars and has the following four working modes:

Mode I:

When a gasoline engine vehicle or electric motor car equipped with the system according to the present invention is travelling, the main switch S0 is always in its close position.

When the switch S1' is open and the switch S3 is in position A, the control means works in a manner similar to the control means shown in FIG. 16, i.e., the operation of the enforcing means is controlled only by the button switch S.

Mode II:

When the switch S1' is close and the switch S3 remains in position A and if the accelerator pedal is pressed down, the relay K2 is energized so that its normal close contact K2 (60) is opened. And if the accelerator pedal is now released, the relay K2 is deenergized so that its contact K2 (60) is closed and the relay K1 is energized, causing the normal-open contact K1 (61) to be closed and the normal-closed time-delay contact K1 (62) to delay in opening and therefore Q1 is energized during the delay period of the contact K1 (62). As a result, the enforcing means forces the synchronous cage 10 to rotate along with the hub 6, causing the torque-transmitting elements 12 to move from the first position I to the second position II since the speed of the drive member 3 becomes lower than that of the driven member 7 after the accelerator pedal is released. In this case, the engine is conversely driven by the wheels so as to retard the vehicle or to improve the bracking effect.

Mode III:

When the switch S1' is open and the switch S3 is in position B and when the accelerator pedal is in its pressed-down position, the switch S2' coupled with the accelerator pedal is in its close position and the relay K2 is on so that its normal close contact K2 (65) is in its open position and its normal open contact K2 (63) is in its close position, ensuring that the ignition circuit Q2 of the engine is on.

If the accelerator pedal is now released, the switch S2' is opened and the relay K2 is deenergized so that the contact K2 (64) is opened, the contact K2 (65) is closed and the contact K2 (63) is opened, causing the ignition circuit Q2 of the engine to be turned off. In this case, the vehicle is coasting in a manner that the engine is shut down and the drive member 3 of the automatic clutch means is in disengagement with the driven member 7 so that the optimal energe-saving effect can be made. If the accelerator pedal is pressed down again, the relay K2 is energized so that the contact K2 (63) is closed and the ignition circuit Q2 is turned on, meanwhile the contact K2 (64) is closed and the normal close and time-delay contact K2 (65) delays in opening. Thus, Q1 is energized during the delay period of the contact K2 (65), causing the torque-transmitting elements 12 to move from the middle position III to the second position II since the enforcing means forces the synchronous cage 10 to rotate along with the hub 6. As a result, the engine is driven by the wheels so as to be re-started. The torque-transmitting elements 12 then move from the second position II to the first position I due to the inertia lag of the synchronous cage 10 and the torque-transmitting elements 12 behind the shaft 4 in rotation.

Mode IV:

When the switch S1' is close and the switch S3 is in position B and when the accelerator pedal is in its pressed-down position, the switch S2' coupled with the accelerator pedal is in its close position and the relay K2 is on so that the contact K2 (64) is in its close position and the contact K2 (65) is in its open position, meanwhile the contact K2 (63) is in its close position, ensuring that the ignition circuit Q2 is on. If the accelerator pedal is released, the switch S2' is opened and the relay K2 is deenergized so that the contact K2 (64) is opened and the contact K2 (63) is opened. Therefore, the ignition circuit Q2 is turned off and the engine is shut down, meanwhile the contact K2 (60) is closed and the relay K1 is energized so that the contact K1 (61) is closed and the time-delay contact K1 (62) delays in opening. Thus, Q1 is energized during the delay period of the contact K1 (62), causing the torque-transmitting elements 12 to move from the first position I to the second position II since the enforcing means forces the synchronous cage 10 to rotate along with the hub 6. In this case, the vehicle travels in a manner that the engine is shut down and driven conversely by the wheels since the drive member 3 of the automatic means is now in engagement with the driven member 7 through the torque-transmitting elements 12. Much more of the kinetic energy of the vehicle is consumed when the engine is shut down than when the engine is idle. Therefore, the vehicle is retarded more effectively. And if the accelerator pedal is pressed down again, the switch S2' coupled with the accelerator pedal is closed and the relay K2 is energized so that the contact K2 (63) is closed to turn on the ignition circuit Q2, the contact K2 (64) is closed and the time-delay contact K2 (65) delays in opening. As a result, Q1 is energized during the delay period of the contact K2 (65) so that the engine is driven and re-started by the wheels as described above.

Optionally, a normal close contact K2 (66) of the relay K2 may be provided to control an indicating lamp Q3 in such a manner that the indicating lamp Q3 is turned off so long as the accelerator pedal is pressed down and it is turned on so long as the accelerator pedal is released, indicating that the vehicle is travelling in a coasting mode.

The driver of the vehicle may make choice of the four working modes of the control means 2 in accordance with the traffic circumstances. When Mode I or Mode III is selected, an effect of energy-saving can be made. Preliminary trial running has proved that the energy consumption of the vehicle can be reduced by about 18%.

Before describing the system according to the second aspect of the present invention, it should be noted that when a center brake is used for parking the vehicle, the automatic clutch means 1 should be disposed before the center brake in the drive-system of the vehicle, otherwise the center brake could lose its function. For example, the hub 6 of the automatic clutch means 1 should be rigidly connected to the brake hub or disc of the center brake in order to maintain the parking function of the center brake.

Figure 19:
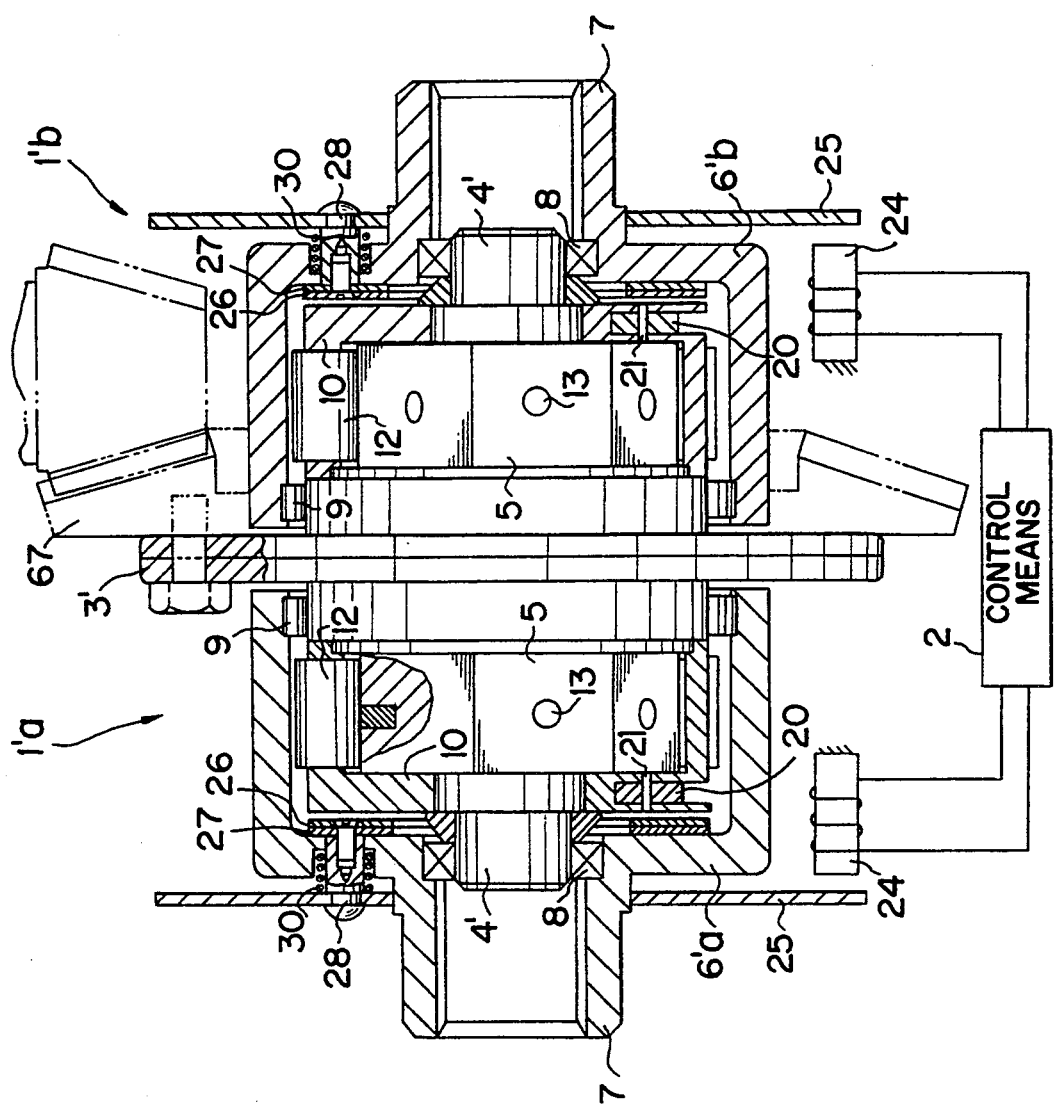
FIG. 19 is a diagrammatic view of the system according to the second aspect of the present invention, in which the automatic clutch unit is disposed in place of the original differential of the vehicle.

As shown in FIG. 19, a multifunctional energy-saving system according to the second aspect of the present invention is composed of an automatic clutch unit 1' and control means 2.

The automatic clutch unit 1' consists of two portions 1'a and 1'b. The two portions 1'a and 1'b are similar to the automatic clutch means 1 of the system according to the first aspect of the present invention and symmetric with each other in respect to the intermediate cross-section of a flange 3' used as a common drive member of the two portions 1'a and 1'b. The flange 3' is rigidly connected to a driven bevel gear 67 of a final reduction gearing of the drive-system of the vehicle, and the hubs 6'a and 6'b of the two portions 1'a and 1'b are rigidly connected respectively to the semiaxles on both sides of the vehicle.

The control means of the system according to the second aspect of the present invention is similar to that of the system according to the first aspect of the present invention and may be any of those described by referring to FIGS. 16, 17 and 18.

When the vehicle equipped with the system according to the second aspect of the present invention is driven by the engine to travel along a straight road, the hubs 6'a and 6'b of the automatic clutch unit 1' rotate at the same speed since they are now in engagement with a single shaft 4'.

When the vehicle is driven by the engine to travel along a curve road, the hub 6'a or 6'b of the automatic clutch unit 1' on the inner side of the curve road is in engagement with the shaft 4' and the other hub on the outer side of the curve road is disengaged with the shaft 4' since it is now driven by the wheel on the outer side to rotate at a higher speed than the shaft 4'. That is to say, the differential function can be effected. Furthermore, driving torque can be automatically distributed from one driving wheel with a smaller adhensive force to the other driving wheel with a larger adhensive force and it will never occur that one driving wheel slips while the other driving wheel does not rotate. Therefore, a particular advantage of the system according to the second aspect of the present invention is that it can not only overcome the problems arising from converse-driving but also function as a differential with a good anti-slip performance.

Of course, the invention is not limited to the illustrated embodiments described herein. It will be understood that various changes or modifications may be made to these embodiments without departing from the spirit and scope of the present invention.

What is claimed is:

1. A device for transmitting torque between a drive member and a driven member for vehicles, said system consisting of automatic clutch means (1) disposed within a drive-system and control means (2) operable in a driver's cab, said automatic clutch means (1) comprising:
a drive member (3);
a driven member (7);
a shaft (4) rigidly connected to or integrally formed with the drive member (3) and having a substantially regular prismatic section (5) concentric therewith;
a hub (6) connected to or integrally formed with the driven member (7) and mounted concentrically on said shaft (4) by means of bearings (8,9), said regular prismatic section (5) being positioned within the hub (6);
a synchronous cage (10) rotatably supported at its axial ends on the shaft (4) between an inner surface of the hub (6) and said regular prismatic section (5), and having openings (11) evenly distributed around a circumference of the synchronous cage (10), the number of said openings (11) being the same as that of side surfaces of said regular prismatic section (5);
a torque-transmitting element (12) provided in each said opening (11) with a clearance therebetween, and movable on a respective side surface of said regular prismatic section (5) between a first position (I) near one end of respective arched space defined between the inner surface of the hub (6) and the side surface of said regular prismatic section (5) and a second position (II) near the other end of said arched space, each torque-transmitting element (12) being dimensioned so that when it is in a middle position (III) between said first position (I) and second position (II), the hub (6) is in disengagement with the shaft (4) and no torque is transmitted between the shaft (4) and the hub (6), and when it is in said first position (I) or said second position (II), the hub (6) is in engagement with the shaft (4) and torque is transmitted between the shaft (4) and the hub (6) through the torque-transmitting element (12);

means for holding each torque-transmitting element (12) in said middle position (III) when said shaft (4) rotates at a speed lower than its idle speed or does not rotate, each said torque-transmitting element (12) entering said first position (I) due to inertia lag behind the shaft (4) when the drive member (3) starts to rotate in a positive direction (14);

means for restricting each torque-transmitting element (12) in said middle position (III) when the speed of the drive member (3) becomes lower than that of the driven member (7) only in said positive direction; and means for enforcing the synchronous cage (10) to temporarily rotate along with said hub (6) so as to force each torque-transmitting element (12) to move from said middle position (III) to one of said first position (I) or said second position (II);

wherein said control means (2) controls the operation of said enforcing means.

2. A device for transmitting torque between a drive member and a driven member for vehicles according to claim 1, wherein said holding means comprises a magnet (13) mounted in the middle of each side surface of said regular prismatic section (5) of said shaft (4).

3. A device for transmitting torque between a drive member and a driven member for vehicles according to claim 1, wherein said holding means comprises two elastic loops (32) respectively winding round both axial ends of said torque-transmitting elements (12").

4. A device for transmitting torque between a drive member and a driven member for vehicles according to claim 1, wherein said holding means comprises extension springs (33) connected between the synchronous cage (10) and said regular prismatic section (5) of the shaft (4), and dovetail slide means (67) between each said torque-transmitting element (12') and the regular prismatic section (5).

5. A device for transmitting torque between a drive member and a driven member for vehicles according to claim 1, wherein said restricting means comprises:
at least two grooves (15) evenly distributed in the circumference of the synchronous cage (10);
recesses (16) formed in said shaft and each of said recesses (16) associated with one of said grooves (15) and having a radial wall (17);
an opening (18) formed in the bottom of each of said groove (15) and communicating with one of said recesses (16);
a magnet (19) mounted in the bottom of each said groove (15); and
a rocking lever (20) pivotally mounted in each said groove (15) and having a spring (23) fixed at one end thereon and extending through said opening (18), the rocking lever (20) being arranged so that the rocking lever (20) is held on the bottom of the groove (15) by means of said magnet (19), causing said spring (23) to be situated outside said recess (16) in said shaft (4) when said shaft (4) rotates at a speed lower than a predetermined value or does not rotate, and pivots against the attractive force of said magnet (19) due to centrifugal force, causing said spring (23) to enter said recess (16) in said shaft (4) when the speed of said shaft (4) reaches said predetermined value, the stiffness of said spring (23) ensuring that the spring (23) can abut against said radial wall (17) of said recess (16) so as to restrict the torque-transmitting elements (12) in said middle position (III) during the movement of the torque-transmitting element (12) from said first position (I) towards said second position (II) whenever the speed of the shaft (4) becomes lower than that of the hub (6), and that the spring (23) can be bent by said radial wall (17) so as to enable the torque-transmitting element (12) to move from the middle position (III) to the second position (II) when said enforcing means forces the synchronous cage (10) to rotate along with the hub (6).

6. A device for transmitting torque between a drive member and a driven member for vehicles according to claim 1, wherein said restricting means comprises:

at least two grooves (34) evenly distributed around the circumference of said shaft (4);

a magnet (35) mounted in the bottom of each groove (34);

stop means (36) formed on the inner surface of the synchronous cage (10);

a rocking lever means (37) pivotally mounted at one end in each said groove (34) and having a sleeve (39); a member (40) axially sliding within said sleeve (39); and a spring (41) biasing said sliding member (40) to an extended position, the rocking lever means (37) being arranged so that when said shaft (4) rotates at a speed lower than a predetermined value or does not rotate, the rocking lever means (37) is held on the bottom of said groove (34) by means of said magnet (35) and the sliding member (40) in the extended position does not interfere in the relative rotation of the synchronous cage (10) with respect to the shaft (4), and when the speed of said shaft (4) reaches said predetermined value, the rocking lever means (37) pivots due to the centrifugal force so that the sliding member (40) in the extended position comes into contact with the inner surface of the synchronous cage (10);

the stiffness of said spring (41) ensuring that the sliding member (40) remains in said extended position and abuts against said stop means (36) so as to restrict said torque-transmitting element (12) right in said middle position (III) during the movement of said torque-transmitting element (12) from said first position (I) towards said second position (II) whenever the speed of the shaft (4) becomes lower than that of the hub (6), and that the sliding member (40) can be pressed back into said sleeve (39) by said stop means (36) so as to enable the torque-transmitting element (12) to move from said middle position (III) to said second position (II) when said enforcing means forces the synchronous cage (10) to rotate along with the hub (6).

7. A device for transmitting torque between a drive member and a driven member for vehicles according to claim 1, wherein said restricting means comprises:

at least two holes (42) in the shaft (4), the axes of both holes (42) lying in a plane perpendicular to the axis of the shaft (4);

a magnet (43) mounted on the bottom of each said hole (42);

stop means (44) on the inner surface of the synchronous cage (10);

a pin (45) axially movable in each said hole (42), the outer end of each said pin (45) being of truncated cone shape, each said pin (45) being arranged so that when the speed of the shaft (4) is lower than a predetermined value or does not rotate, the pin (45) is held on the bottom of the hole (42) by means of said magnet (43) without interfering in the relative rotation of the synchronous cage (10) with respect to the shaft (4), and when the speed of the shaft (4) reaches said predetermined value, the pin (45) comes against the attractive force of said magnet (43) into contact with the inner surface of the synchronous cage (10) due to centrifugal force, the combination of the cone angle of said outer end of the pin (45) and the direction of the hole (42) extending in said plane perpendicular to the axis of the shaft (4) ensuring that the outer end of the pin (45) can abut against said stop means (44) without being pressed back into the hole (42) by said stop means (44) so as to restrict the torque-transmitting element (12) right in said middle position (III) during the movement of the torque-transmitting element (12) from said first position (I) towards said second position (II) whenever the speed of the shaft (4) becomes lower than that of the hub (6), and that the pin (45) can be pressed back into the hole (42) by said stop means (44) against the static frictional force therebetween so as to enable the torque-transmitting element (12) to move from said middle position (III) to said second position (II), when said enforcing means forces the synchronous cage (10) to rotate along with the hub (6).

8. A device for transmitting torque between a drive member and a driven member for vehicles according to claim 1, wherein said enforcing means comprises:

actuator means (24) non-rotatably supported and controlled by said control means (2);

friction means (26,47) adapted to be engaged with the synchronous cage (10), and a driving assembly (25,28,27; and 46) provided on the hub (6) for transmitting the power of said actuator means (24) to said friction means (26,47) so that the friction means (26,47) can be engaged with the synchronous cage (10).

9. A device for transmitting torque between a drive member and a driven member for vehicles according to claim 8, wherein said actuator means comprises an electromagnet.

10. A device for transmitting torque between a drive member and a driven member for vehicles according to claim 8, wherein said control means (2) comprise a button switch (S) to control energizing said actuator means (24).

11. A device for transmitting torque between a drive member and a driven member for vehicles according to claim 10, wherein said control means (2) further comprises:

a first switch (S1) for selecting working modes of the system; and a time-delay circuit (K1) controlled by another switch (S2) coupled with a vehicle accelerator pedal for energizing said actuator means (24) so that an engine engages driving wheels when the accelerator pedal is released.

12. A device for transmitting torque between a drive member and a driven member for vehicles according to claim 10, wherein said control means (2) further comprises:
- switches (S1 and S3) for selecting working modes of the system;
- a first time-delay circuit (K1') controlled by another switch (S2') coupled with a vehicle accelerator pedal for energizing said actuator means (24) so that an engine engages driving wheels when the accelerator pedal is released; and
- a second time-delay circuit (K2) controlled by said another switch (S2') coupled with the accelerator pedal for turning off an ignition circuit (Q2) of the engine when the accelerator pedal is released and for turning on the ignition circuit (Q2) and temporarily energizing said actuator means (24) so as to engage the engine with the driving wheels during a delay period in opening said second time-delay circuit (K2) so that the engine is driven and restarted by the wheels when the accelerator pedal is pressed down again.

13. A device for transmitting torque between a drive member and a driven member for vehicles according to claim 11 wherein said control means (2) further comprises:
- an indicating lamp (Q3) controlled by said another switch (S2) coupled with the accelerator pedal in such a manner that said indicating lamp (Q3) is turned on when the accelerator pedal is released and turned off when the accelrator pedal is pressed down.

14. A device for transmitting torque between a drive member and a driven member for vehicles according to claim 1, wherein said drive member (3) of the automatic clutch means (1) is a flange, an automatic clutch unit (1') comprises said automatic clutch means (1) and further includes a portion completely symmetrical therewith in respect to an intermediate cross-section of said flange, said flange is connected to a driven bevel gear (67) of a final reduction gearing and hubs (6'a, 6'b) are connected on both sides of the automatic clutch unit (1') to vehicle semiaxles, whereby said unit (1') may be substituted for an original differential.

* * * * *